J. L. BURNHAM.
BARRIER OR ARC DEFLECTOR FOR DYNAMO ELECTRIC MACHINES OR THE LIKE.
APPLICATION FILED MAR. 6, 1918.

1,331,897.

Patented Feb. 24, 1920.

Inventor:
Joseph L. Burnham,
by
His Attorney.

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

BARRIER OR ARC-DEFLECTOR FOR DYNAMO-ELECTRIC MACHINES OR THE LIKE.

1,331,897. Specification of Letters Patent. Patented Feb. 24, 1920.

Application filed March 6, 1918. Serial No. 220,864.

*To all whom it may concern:*

Be it known that I, JOSEPH L. BURNHAM, a citizen of the United States, residing at Schenectady, county of Schenectady, State of New York, have invented certain new and useful Improvements in Barriers or Arc-Deflectors for Dynamo-Electric Machines or the like, of which the following is a specification.

My invention relates to barriers or arc deflectors for use on dynamo electric machines or the like provided with commutators. When an arc occurs under a commutator brush on such machines, it establishes a short circuit between adjacent commutator bars which spreads until the arc extends from the brush under which it started to the next adjacent set of brushes or to a part of the machine of opposite polarity or to ground. My invention has for its object to prevent such spreading of arcs produced under brushes on dynamo electric machines.

In accordance with my invention, I provide a barrier between adjacent sets of brushes comprising a pointed member of insulating material mounted so as to be in close proximity to the commutator and inclined thereto so as to scoop or lift the arc from the commutator. By thus lifting the arc from the commutator, its path is lengthened and the establishment of arcs between adjacent sets of brushes or between a set of brushes and another part of the machine is prevented.

Figure 1:
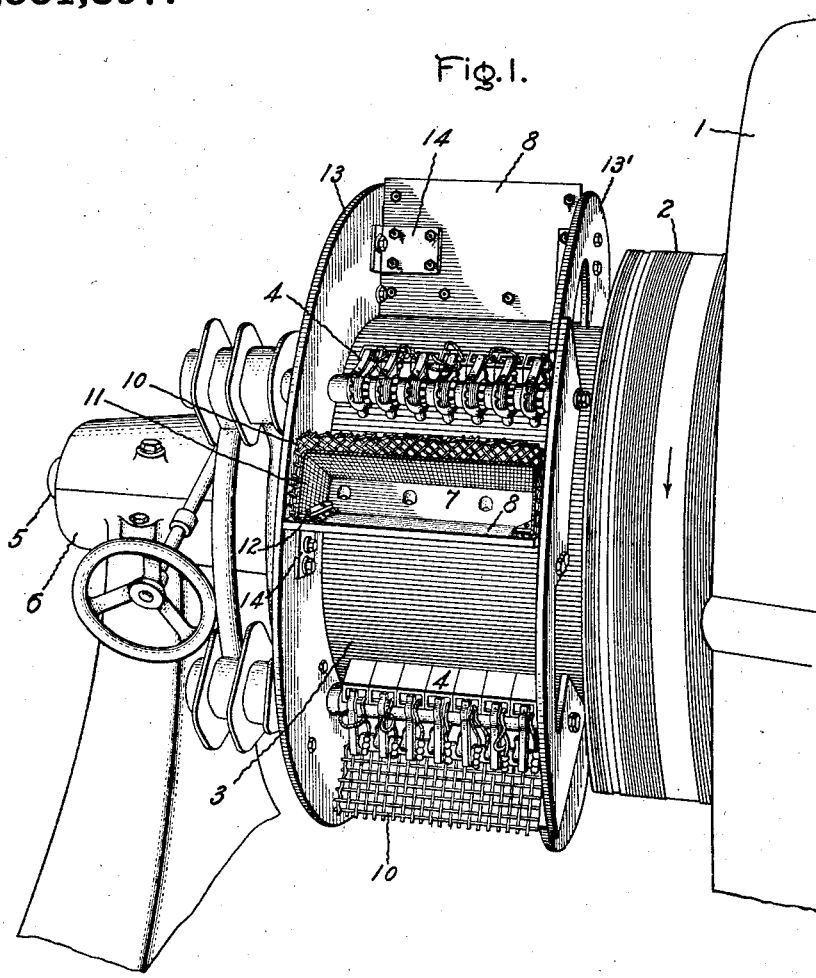
Figure 3:
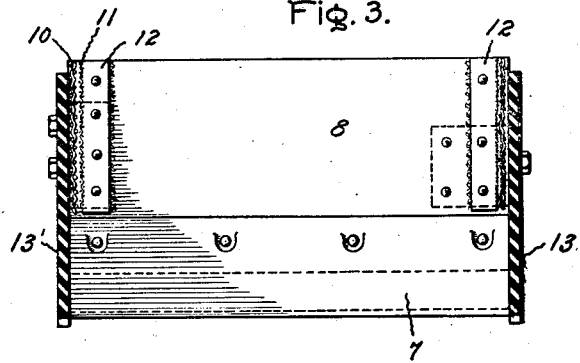
Figure 2:
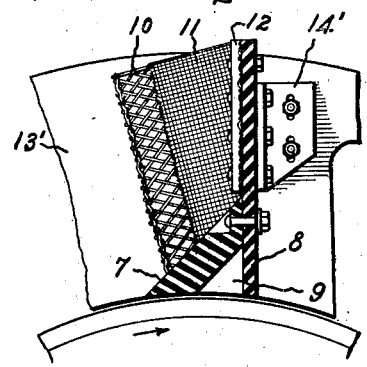

Other features of novelty which characterize my invention are pointed out with particularity in the claims annexed to and forming a part of this specification. For a better understanding of my invention, reference may be had to the following description taken in connection with the accompanying drawing, in which Figure 1 is a perspective view of a dynamo electric machine provided with my invention; Fig. 2 is a sectional view of the barrier of Fig. 1, and Fig. 3 is an elevation of one of my barriers with parts removed.

In Fig. 1 of the drawing there is shown the commutator end of a dynamo electric machine which may be either a direct current motor or generator or a rotary converter. 1 is the frame of the machine, 2 is the armature provided with a commutator 3 on which sets of brushes 4 bear. The armature and commutator are mounted on a shaft 5 which is shown journaled in a bearing 6 and the direction of rotation of the armature is indicated by the arrow. In accordance with my invention, I provide a barrier comprising a pointed member 7 of insulating material mounted so as to be in close proximity to the commutator and inclined thereto at an obtuse angle having reference to the direction of rotation of the commutator. This pointed member 7 acts as a scoop to lift the arc from the commutator and thereby lengthen its path and thus extinguish it. Also mounted in close proximity to the commutator and to the rear of the pointed member 7 having reference to the direction of rotation of the commutator, is a radially disposed member 8 of insulating material which preferably supports the member 7. As clearly seen from the drawing, an air space 9 is formed between the member 7 and the member 8 located near the commutator and which will allow for some expansion of the hot gases if they should be forced under the scoop 7. This air space tends to break up the arc before it can pass under the second barrier. In order to cool the arc which has been picked up from the commutator, a metal screen is provided in front of the radially disposed member 8 having reference to the direction of rotation of the commutator. I preferably provide two metal screens, a coarse mesh metal screen 10 and a fine mesh metal screen 11, the coarse mesh metal screen being located in front of the fine mesh metal screen. The wire of the coarse mesh screen 10 should have sufficient thermal capacity to cool the arc down to the point where there is not enough heat left therein to burn either the coarse mesh or the fine mesh screen. The fine mesh screen takes out substantially all the heat that is left in the arc when it reaches this screen and thus puts the arc out.

The metal screens are mounted on the radially disposed members 8 by means of bolts engaging a member 12, between which and the member 8 the wire screens are clamped. It will thus be seen that the member 8 supports the member 7 and the wire screens 10 and 11, and the whole of the barrier is supported by members 13, 13¹ of insulating material provided at each end of the commutator. This support is provided by brackets 14, 14¹ which are bolted to the radial members 8 and the members 13, 13¹. The members 13, 13¹ also tend to form an arc chute for the arc occuring under the brushes. It will be noted that the wire screens 10 and 11 rest on the insulating member 7 and are thus prevented from coming into contact with the commutator and thereby short circuiting it.

I have found that if a device is provided in the circuit of a dynamo electric machine which will act very quickly to open the circuit thereof, say in a few thousandths of a second, upon the occurrence of a short circuit or a heavy overload, it is not necessary to use the wire screens 10 and 11 in connection with my barrier, and have found that in connection with such a quick acting circuit breaker, the pointed member 7 will scoop up the arc, and the quick-acting circuit breaker will so reduce the volume of the arc that the arc will not spread sufficiently to go around or over a barrier comprising only the member 7 and the member 8. If, however, a slower acting circuit breaker is used, I find that it is necessary to use a metal screen in front of my barrier in order to cool the arc upon the occurrence of a short circuit or heavy overload in order to prevent flash-overs.

I desire it to be understood that I aim in the appended claims to cover such modifications, as well as any other modifications which do not depart from the spirit and scope of my invention.

What I claim as new and desire to secure by Letters Patent of the United States, is,—

1. In combination, a commutator, sets of brushes therefor, and barriers located between adjacent sets of brushes, each of said barriers comprising a pointed member of insulating material mounted so as to be in close proximity to said commutator and inclined thereto at an obtuse angle having reference to the direction of rotation of the commutator.

2. In combination, a commutator, sets of brushes therefor, and barriers located between adjacent sets of brushes, each of said barriers comprising a substantially radially disposed member of insulating material mounted so as to be in close proximity to said commutator and a pointed member of insulating material also mounted in close proximity to said commutator and inclined thereto at an obtuse angle having reference to the direction of rotation of the commutator.

3. In combination, a commutator, sets of brushes therefor, and barriers located between adjacent sets of brushes, each of said barriers comprising a substantially radially disposed member of insulating material mounted so as to be in close proximity to said commutator and a pointed member of insulating material supported by said radially disposed member so as to be in close proximity to said commutator and inclined thereto at an obtuse angle having reference to the direction of rotation of the commutator.

4. In combination, a commutator, sets of brushes therefor, and barriers located between adjacent sets of brushes, each of said barriers comprising a substantially radially disposed metal screen and a pointed member of insulating material mounted so as to be in close proximity to said commutator and inclined thereto at an obtuse angle having reference to the direction of rotation of the commutator.

5. In combination, a commutator, sets of brushes therefor, and barriers located between adjacent sets of brushes, each of said barriers comprising a substantially radially disposed metal screen, a substantially radially disposed member of insulating material mounted so as to be in close proximity to the commutator and supporting said metal screen, said metal screen being located in front of said insulating member having reference to the direction of rotation of the commutator, and a pointed member of insulating material also mounted in close proximity to said commutator and inclined thereto at an obtuse angle having reference to the direction of rotation of the commutator.

6. In combination, a commutator, sets of brushes therefor, and barriers located between adjacent sets of brushes, each of said barriers comprising a substantially radially disposed metal screen, a substantially radially disposed member of insulating material mounted so as to be in close proximity to the commutator and supporting said metal screen, said metal screen being located in front of said insulating member having reference to the direction of rotation of the commutator, and a pointed member of insulating material supported by said radially disposed member of insulating material so as to be in close proximity to said commutator and inclined thereto at an obtuse angle having reference to the direction of rotation of the commutator.

7. In combination, a commutator, sets of brushes therefor, and barriers located between adjacent sets of brushes, each of said barriers comprising a substantially radially disposed fine mesh metal screen, a substantially radially disposed coarse mesh metal screen, a substantially radially disposed member of insulating material mounted so as to be in close proximity to the commutator and supporting said metal screens, said coarse mesh screen being located in front of said fine mesh screen, and both of said screens being located in front of said insulating member having reference to the direction of rotation of said commutator, and a pointed member of insulating material also supported by said radially disposed member of insulating material in close proximity to said commutator and inclined thereto at an obtuse angle having reference to the direction of rotation of the commutator.

8. In combination, a commutator, sets of brushes therefor, barriers located between adjacent sets of brushes, each of said barriers comprising a pointed member of insulating material mounted so as to be in close proximity to said commutator and inclined thereto at an obtuse angle having reference to the direction of rotation of the commutator, and members of insulating material located at each end of the commutator, each of said members extending from a set of brushes to its corresponding barrier.

9. In combination, a commutator, sets of brushes therefor, barriers located between adjacent sets of brushes, each of said barriers comprising a substantially radially disposed member of insulating material mounted so as to be in close proximity to said commutator and a pointed member of insulating material also mounted in close proximity to said commutator and inclined thereto at an obtuse angle having reference to the direction of rotation of the commutator, and members of insulating material located at each end of the commutator, each of said members extending from a set of brushes to its corresponding barrier.

10. In combination, a commutator, sets of brushes therefor, barriers located between adjacent sets of brushes, each of said barriers comprising a substantially radially disposed member of insulating material mounted so as to be in close proximity to said commutator and a pointed member of insulating material supported by said radially disposed member so as to be in close proximity to said commutator and inclined thereto at an obtuse angle having reference to the direction of rotation of the commutator, and members of insulating material located at each end of the commutator, each of said members extending from a set of brushes to its corresponding barrier.

11. In combination, a commutator, sets of brushes therefor, barriers located between adjacent sets of brushes, each of said barriers comprising a substantially radially disposed metal screen and a pointed member of insulating material mounted so as to be in close proximity to said commutator and inclined thereto at an obtuse angle having reference to the direction of rotation of the commutator, and members of insulating material located at each end of the commutator, each of said members extending from a set of brushes to its corresponding barrier.

12. In combination, a commutator, sets of brushes therefor, barriers located between adjacent sets of brushes, each of said barriers comprising a substantially radially disposed metal screen, a substantially radially disposed member of insulating material mounted so as to be in close proximity to the commutator and supporting said metal screen, said metal screen being located in front of said insulating member having reference to the direction of rotation of the commutator, and a pointed member of insulating material also mounted in close proximity to said commutator and inclined thereto at an obtuse angle having reference to the direction of rotation of the commutator, and members of insulating material located at each end of the commutator, each of said members extending from a set of brushes to its corresponding barrier.

13. In combination, a commutator, sets of brushes therefor, barriers located between adjacent sets of brushes, each of said barriers comprising a substantially radially disposed metal screen, a substantially radially disposed member of insulating material mounted so as to be in close proximity to the commutator and supporting said metal screen, said metal screen being located in front of said insulating member having reference to the direction of rotation of the commutator, and a pointed member of insulating material supported by said radially disposed member of insulating material so as to be in close proximity to said commutator and inclined thereto at an obtuse angle having reference to the direction of rotation of the commutator, and members of insulating material located at each end of the commutator, each of said members extending from a set of brushes to its corresponding barrier.

14. In combination, a commutator, sets of brushes therefor, barriers located between adjacent sets of brushes, each of said barriers comprising a substantially radially disposed fine mesh metal screen, a substantially radially disposed coarse mesh metal screen, a substantially radially disposed member of insulating material mounted so as to be in close proximity to the commutator and supporting said metal screens, said coarse mesh screen being located in front of said fine mesh screen, and both of said screens being located in front of said insulating member having reference to the direction of rotation of said commutator, and a pointed member of insulating material also supported by said radially disposed member of insulating material in close proximity to said commutator and inclined thereto at an obtuse angle having reference to the direction of rotation of the commutator, and members of insulating material located at each end of the commutator, each of said members extending from a set of brushes to its corresponding barrier.

In witness whereof I have hereunto set my hand this fourth day of March, 1918.

JOSEPH L. BURNHAM.